(12) United States Patent
Albrecht et al.

(10) Patent No.: US 10,256,992 B2
(45) Date of Patent: Apr. 9, 2019

(54) TUNNEL ENCAPSULATION

(71) Applicant: HEWLETT PACKARD ENTERPRISE DEVELOPMENT LP, Houston, TX (US)

(72) Inventors: Alan Ray Albrecht, Roseville, CA (US); Thomas A. Keaveny, Roseville, CA (US); Joseph Daniel Gleason, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 5 days.

(21) Appl. No.: 15/504,216

(22) PCT Filed: Oct. 30, 2014

(86) PCT No.: PCT/US2014/063179
§ 371 (c)(1),
(2) Date: Feb. 15, 2017

(87) PCT Pub. No.: WO2016/068944
PCT Pub. Date: May 6, 2016

(65) Prior Publication Data
US 2017/0279638 A1 Sep. 28, 2017

(51) Int. Cl.
*H04L 12/46* (2006.01)
*H04L 29/06* (2006.01)

(52) U.S. Cl.
CPC .......... *H04L 12/4633* (2013.01); *H04L 69/22* (2013.01); *H04L 2212/00* (2013.01)

(58) Field of Classification Search
CPC ............................ H04L 12/4633; H04L 12/66
See application file for complete search history.

(56) References Cited

U.S. PATENT DOCUMENTS

| | | | |
|---|---|---|---|
| 7,290,134 B2 | 10/2007 | Buer et al. | |
| 7,894,364 B2 | 2/2011 | Baron et al. | |
| 8,170,023 B2 | 5/2012 | Rajakarunanayake et al. | |
| 8,737,388 B2 | 5/2014 | Zhu et al. | |
| 9,641,435 B1* | 5/2017 | Sivaramakrishnan | H04L 45/745 |
| 2005/0232277 A1* | 10/2005 | See | H04L 49/90 370/395.52 |
| 2008/0095149 A1 | 4/2008 | Dai | |
| 2011/0261710 A1 | 10/2011 | Chen et al. | |
| 2012/0008505 A1 | 1/2012 | Lavigne et al. | |

(Continued)

FOREIGN PATENT DOCUMENTS

KR  1020090013992 A  2/2009

OTHER PUBLICATIONS

International Search Report and Written Opinion, International Application No. PCT/US2014/063179, dated Jul. 16, 2015, pp. 1-12, KIPO.

*Primary Examiner* — Melanie Jagannathan
(74) *Attorney, Agent, or Firm* — Sheppard Mullin Richter & Hampton

(57) ABSTRACT

According to an example, a packet is tunnel encapsulated a packet according to a tunnel encapsulation template. The tunnel encapsulation template includes fields for the tunnel encapsulated packet, and the fields include static fields and variable fields. Field values are inserted into variable fields of the tunnel encapsulation template to generate the tunnel encapsulated packet.

20 Claims, 5 Drawing Sheets

(56) References Cited

U.S. PATENT DOCUMENTS

2013/0003736 A1\* 1/2013 Szyszko .............. H04L 47/2441
370/392
2013/0287030 A1 10/2013 Mohan et al.
2015/0295729 A1\* 10/2015 Bevinamarad ...... H04L 12/4633
370/474

\* cited by examiner

TUNNEL ENCAPSULATION

BACKGROUND

Tunneling is often used to connect two networks through a transport network that utilizes a different protocol. For example, it is not uncommon to connect two local area networks (LANs) via the Internet via an Internet Protocol (IP) tunnel. The LANs may be layer 2 networks and the Internet is layer 3. The layers refer to layers of a network model. For example, the Open Systems Interconnection Basic Reference Model (the "OSI Model") is a well-known, abstract description for communications and computer network protocol design, consisting of seven layers. In the OSI model, there exists a Network Layer (layer 3) and a Data Link Layer (layer 2).

The network layer provides the functional and procedural means of transferring variable length data sequences from a source to a destination by performing network routing functions. At a physical level, the data link layer provides the functional and procedural means to transfer data between individual network entities, thus allowing for the transfer of data from a source to its ultimate destination in a network. Thus, the cumulative operations performed at the data link layer allows for the transfer of data at the network level.

Referring back to the example whereby two LANs are connected via the Internet through an IP tunnel, layer 2 packets, which use media access control (MAC) addresses for routing in the LAN, are encapsulated with a layer 3 header, which use IP addresses for routing, and transmitted over the Internet in the IP tunnel to the other LAN. The tunneling involves the use of a tunneling protocol to encapsulate the payload of a packet (e.g., layer 2 packet payload) within another header (e.g., layer 3 packet header). The header contains routing information that is used to transmit the data packet through the tunnel.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
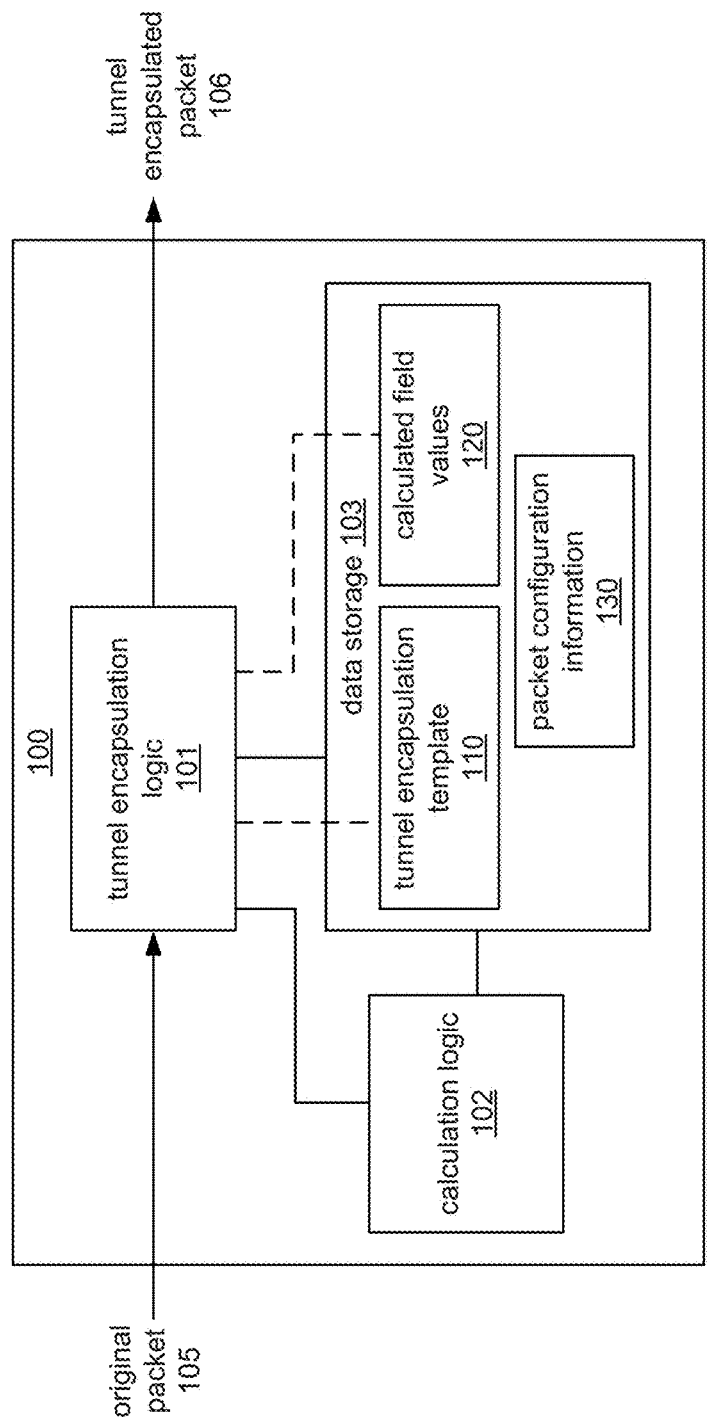
FIG. 1 shows an integrated circuit for tunnel encapsulation in a network device, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

According to an example of the present disclosure, a network device includes an integrated circuit including encapsulation logic and calculation logic, and including data storage that stores a tunnel encapsulation template. Tunnel encapsulated packets are flexibly formed by the encapsulation logic using the tunnel encapsulation template.

Tunnel encapsulation involves the use of a tunneling protocol to encapsulate a packet, referred to as the original packet, within another header for transmission over a tunnel. Examples of tunneling protocols are Generic Routing Encapsulation (GRE), IPSec, and IP over IP. These tunneling protocols use packets as a medium of exchange and include the addition of a new IP header to an IP packet before sending them across a tunnel created over an IP-based network. Tunneling may be used to carry a payload over an incompatible delivery-network and may be used for securing the payload during the delivery.

The encapsulation process for tunnel encapsulation follows a particular packet data protocol that defines the structure of a packet, such as the location of the source address and the destination address and other fields in the packet header. Common packet data protocols used in conjunction with the Internet include IP protocol, transmission control protocol ("TCP"), user datagram protocol ("UDP") and Internet control message protocol ("ICMP").

As stated above, tunnel encapsulated packets are flexibly formed by the encapsulation logic using the tunnel encapsulation template. The tunnel encapsulation template includes header fields in one or more encapsulation headers for the tunnel encapsulated packet. Some of the header fields are fixed fields and some are variable but the size of the header fields does not vary and is defined by the protocol. The field values for the fixed fields are included in the tunnel encapsulation template and may be predetermined based on the tunnel instance. For example, a network device may support multiple tunnels of the same type, e.g. IPv4 GRE, with some fields fixed and some field values determined based on the tunnel instance. For example, source and destination IP addresses may be specific to a particular instance of the tunnel while the protocol identifier fields may be fixed for that tunnel type.

The field values for the variable fields may vary per packet and may be pre-calculated and stored in the data storage. These field values may be overwritten in the template. For example, specific fields unique to the generation of a particular packet are determined and overwritten in the template. The rules for generating the fields may be specific to a type of tunnel or specific to a particular instance.

The encapsulation logic and calculation logic are hardware. For example, the encapsulation logic and calculation logic may be implemented in an application specific integrated circuit (ASIC). In another example, the encapsulation logic and calculation logic may comprise a hardware circuit with a focused instruction set that is limited to packet encapsulation instructions.

Also, the encapsulation logic and calculation logic are hardware that may be designed to perform tunnel encapsulation at line rates. For example, the encapsulation logic may generate at least 16 bytes of packet data per clock cycle. The ability to generate a 128 byte packet in about 8 to 10 clock cycles is a high packet per second rate when compared to conventional processes which may use a general purpose processor for tunnel encapsulation. Furthermore, the calculation logic can save clock cycles by pre-calculating various fields in hardware. Furthermore, the encapsulation logic can flexibly form encapsulated packets at the high data rate through use of the tunnel encapsulation template.

FIG. 1 shows an integrated circuit 100 including an encapsulation logic 101, calculation logic 102, and data storage 103, such as random access memory. The integrated circuit 100 may be a network chip, which is a chip provided in a network device that can send and receive packets and tunnel encapsulate packets. The integrated circuit 100 may include other components not shown.

The data storage 103 may store tunnel encapsulation template 110 and calculated field values 120 calculated by the calculation logic 102. The data storage 103 may also store packet configuration information 130, such as information for determining a total length of the tunnel encapsulated packet, a length of a portion of the tunnel encapsulated packet included within a layer 3 header length field, and length to be included in a layer 4 length field. Examples of the calculated field values 120 calculated by the calculation logic 102 include counters, an identification (ID) field, such as an ID field in IPv4 that may be unique for each packet, and total length, which may vary based on payload size and includes encapsulation header size. The calculation logic 102 may execute mathematical functions to calculate the calculated field values 120. The configuration information 130 may be used to calculate the total length.

The integrated circuit 100 receives an original packet 105, such as a layer 2 packet. The encapsulation logic 101 reads the header and determines the payload length. The calculation logic 102 calculates the calculated field values 120. The tunnel encapsulation logic 101 generates an encapsulation header including the tunnel encapsulation template 110 and overwrites variable fields in the template 110 with the calculated field values 120 and other variable field values which may be determined from the configuration information 130. The original packet 105 is encapsulated to generate the tunnel encapsulated packet 106 and the bits for the tunnel encapsulated packet 106 are transmitted over a network to a destination of the tunnel.

The calculation logic 102 can pre-calculate field values after the original packet 105 is received but before the tunnel encapsulation template 110 is used to generate the tunnel encapsulated packet 106. For example, the calculation logic 102 may analyze packet headers, a payload, a packet size and/or other fields or attributes of the original packet 105. From this information, the calculation logic 102 may determine a transform or mathematical function for calculating a variable field value or another field value to be included in the tunnel encapsulation template 110. For instance, the calculation logic 102 may analyze Layer 2 (Ethernet) and/or Layer 3 (IP) headers and a size of an IP datagram to determine a modification state of the packet. A transform is selected based on the determined modification state, and field values, such as field values 120, are calculated according to the selected transform. The calculated field values are passed to the encapsulation logic 101 when the tunnel encapsulation template 110 is used for the tunnel encapsulation. Different types of packets may have different modification states which causes different transforms to be executed to calculate field values. For example, a TTL field may be calculated differently for different modification states or a GRE key field value is calculated differently for different modification states.

Figure 2:
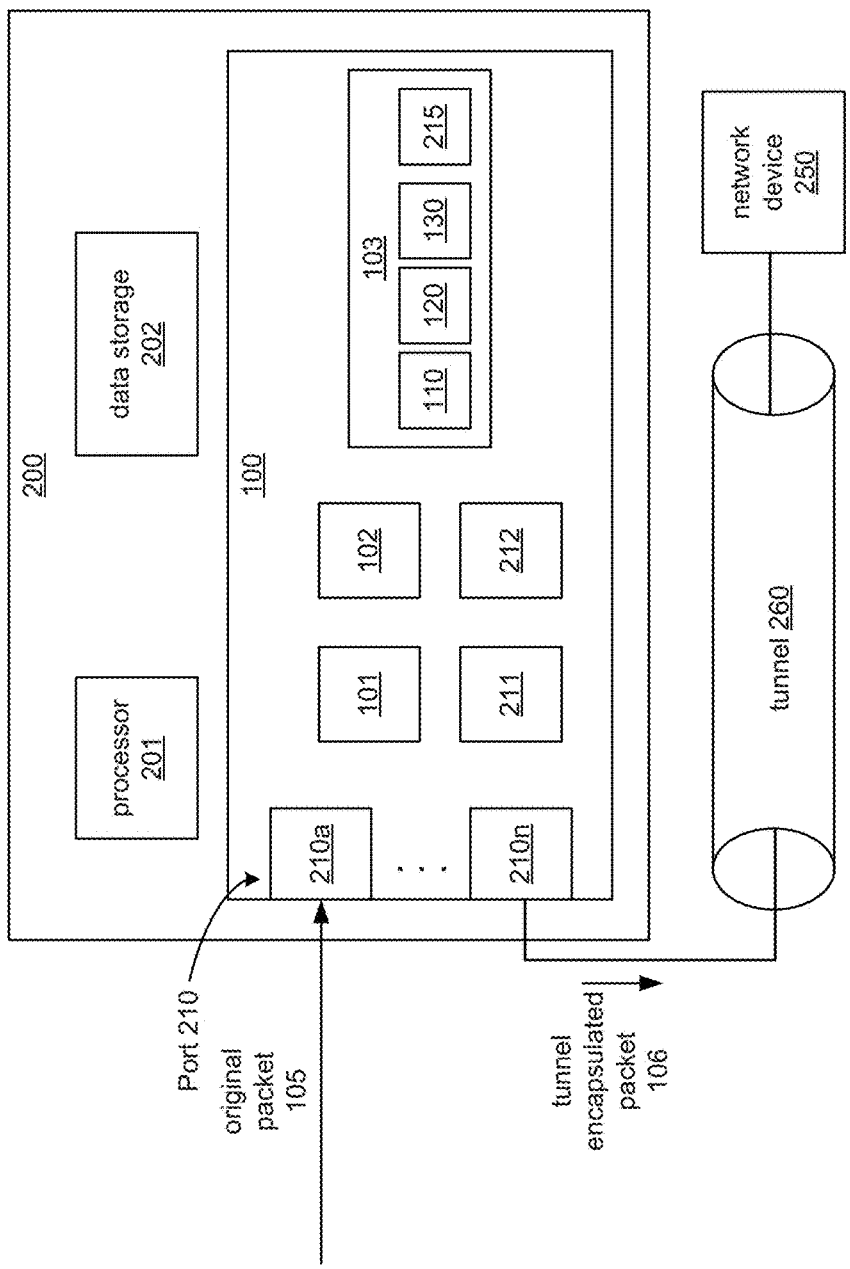
FIG. 2 shows the network device connected to network, according to an example of the present disclosure.

FIG. 2 shows the integrated circuit 100 in a network device 200 according to an example. The network device 200 can include a switch, router, hub, etc. The network device 200 includes the integrated circuit 100 and may include a processor 201 and data storage 202, such as memory, for storing routing tables, performing routing functions, etc. The integrated circuit 100 is shown in FIG. 1 and may include additional components such as shown in FIG. 2. For example, the integrated circuit 100 may include ports 210 to send and receive packets through a network. The integrated circuit 100 may also include tunnel selection logic 211 and checksum logic 212. The tunnel selection logic 211 determines whether a received packet is to be tunnel encapsulated and may select a tunnel for a received packet based on criteria. The criteria may be based on the source port on which the packet was received, source address, destination address, source virtual local area network, etc. The tunnel selection logic may select a tunnel from a plurality of tunnels for the received packet based on the criteria. The network device 200 may support multiple tunnels, and a tunnel index 215 may be stored in the data storage 103 that identifies the criteria for each tunnel and may also include packet configuration information for each tunnel. For example, each tunnel may have a particular source and destination address and all packets for a particular tunnel are forwarded to the destination address for the tunnel which may be included in the encapsulation header of the tunnel encapsulated packet.

The checksum logic 212 calculates checksums across a range of fields. In one example, the encapsulation logic 101 signals the checksum logic 212 at the start and end of a range of fields as the original packet 105 is being tunnel encapsulated. The checksum logic 212 calculates a checksum based on the field values and the checksum may be written into a field for the tunnel encapsulated packet 106. In one example, the range of fields may be IP header fields.

The tunnel encapsulation logic 101 also includes the ability to operate on additional parameters passed by an associated action list, for example to modify the tunnel encapsulated packet 106 before it goes into the tunnel. For example, the action list provides parameters and/or pointers that specify to transform the payload or add parameters to the packet, such as value in a key field in GRE header. Accordingly, the parameters may include field values for variable fields in the encapsulation header. In one example, actions for the action list that may be specific to a particular tunnel may be stored in the data storage 103. If the packet 105 meets criteria for an action on the action list, the action is performed. For example, a packet from a particular VLAN may trigger a special action to be performed on the packet or insertion of a particular value in the key field or another option field in the encapsulation header.

As shown in FIG. 2, the original packet 105 may be received on a port 210a of the ports 210. For example, the original packet 105 may be from a client device connected to the network device 200 via a LAN or may be from another network device and received via a layer 3 network. Assuming the original packet is determined to be for a tunnel maintained by the network device 200, such as tunnel 260, the tunnel encapsulation logic 101 tunnel encapsulates the original packet 105 to generate the tunnel encapsulated packet 106, which is transmitted from one of the ports 210, such as 210n, over the tunnel 260 in a network, such as the Internet, to a destination network device 250 for the tunnel 260. For example, if the original packet 105 is a layer 2 packet, the entire layer 2 packet is encapsulated in one or more encapsulation headers, which may include layer 3 and/or layer 4 headers. In this manner, the original packet 105 is encapsulated to tunnel the original packet 105 via the tunnel 260 to the destination network device 250 instead of using the normal forwarding logic and protocol employed by the network device 200, which normal forwarding could include examining the network packet's destination MAC, IP addresses, etc., determining a destination based on a routing table, and forwarding the packet to the destination. The destination network device 250 may include similar components, not shown, to the network device 200, and may de-encapsulate the tunnel encapsulated packet 106, for example, by stripping the encapsulation headers, and forward the packet to its destination.

Figure 3:
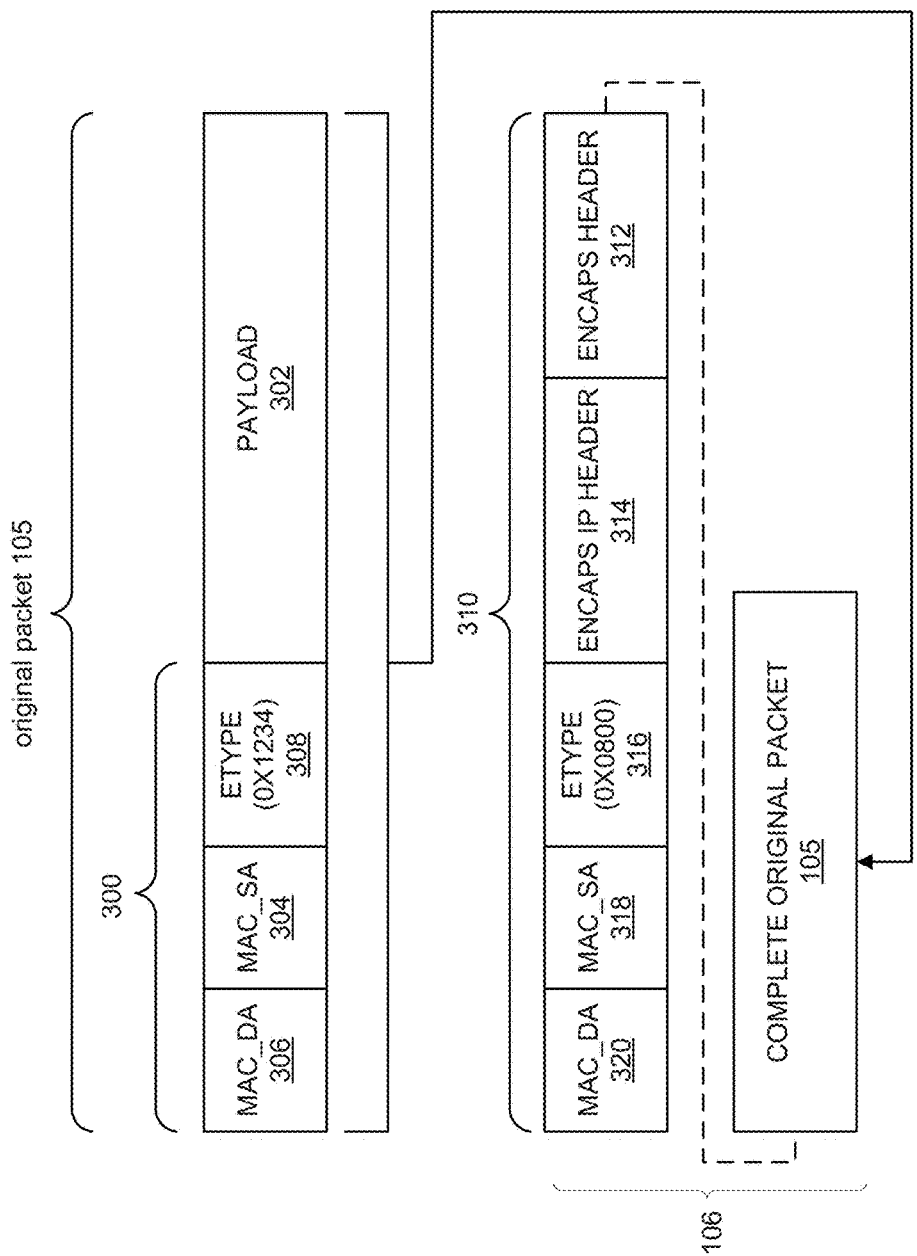
FIG. 3 shows tunnel packet encapsulation, according to an example of the present disclosure.

FIG. 3 shows an example of tunnel encapsulation of a layer 2 packet. For example, the original packet 105 is a layer 2 packet shown in FIG. 3. The original packet 105 includes a payload 302, e.g., the data content, and header information 300. The header information 300 can include a source MAC address 304 (MAC_SA), a destination MAC address 306 (MAC_DA), and can include Ethernet type information 308, among other information. The original packet 105 may be received on a port of the network device 200 such as shown in FIG. 2. The original packet 105 may be selected for tunneling on the tunnel 260 by the tunnel selection logic 211 shown in FIG. 2 based on a number of criteria, such as the source IP address (IP SA), the source port, an IP flow (defined as packet traffic between a particular source IP address and a particular destination IP address), a MAC source address (MAC SA), a MAC destination address (MAC DA), the source VLAN, a traffic type, etc.

The tunnel encapsulation logic 101 tunnel encapsulates the original packet 105, as shown in FIG. 3, with encapsulation header information 310 to create the tunnel encapsulated packet 106. The new packet header information 310 can include an encapsulation header 312, such as a generic routing encapsulation (GRE) header. Other encapsulation header examples include Ethernet-within-IP (RFC3378), Layer 2 Tunneling Protocol (L2TP-RFC3931), etc. The new packet header information 310 can also include an encapsulation IP header 314, an Ethernet type header 316, a source MAC address 318 (MAC_SA), and a destination MAC address 320 (MAC_DA), among other encapsulation header information.

Figure 4:
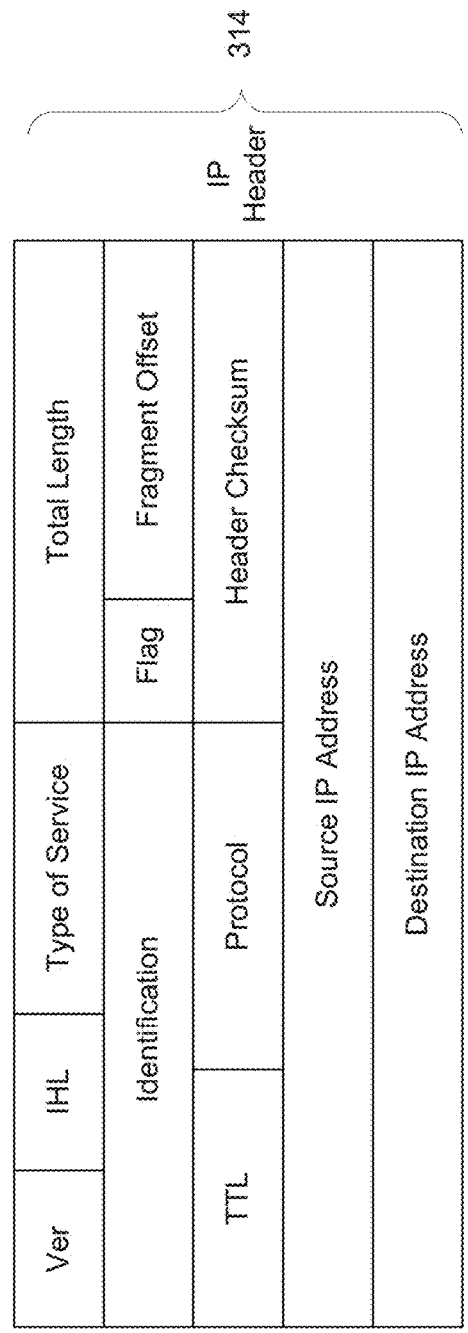
FIG. 4 shows an IP header that may be used for tunnel encapsulation.

The tunnel encapsulation template 110 described with respect to FIG. 1 may include the fields shown for encapsulation header information 310 in FIG. 3, according to an example. The fields for the encapsulation IP header 314 may itself include a number of fields, as shown in FIG. 4. Fields for the encapsulation header 312 are not shown. However, examples of the fields for the encapsulation header 312 may include GRE fields such as described in the RFC 2784 GRE standard. In other examples, the encapsulation header 312 may include fields for a UDP header or a TCP header. In one example, the tunnel encapsulation template 110 is a 64 byte template stored in memory.

The fields for the tunnel encapsulation template 110 include static fields and variable fields as described above. Examples of the variable fields from FIG. 4 may include "Type of Service", "Total Length", "TTL", "Identification" and "Header Checksum". The field values for the variable fields may be calculated by the calculation logic 102, which is shown in FIGS. 1 and 2. The "Total Length" may vary per packet based on payload size. The "Type of Service" may vary based on prioritization rules, and all these variable fields may vary per packet.

Figure 5:
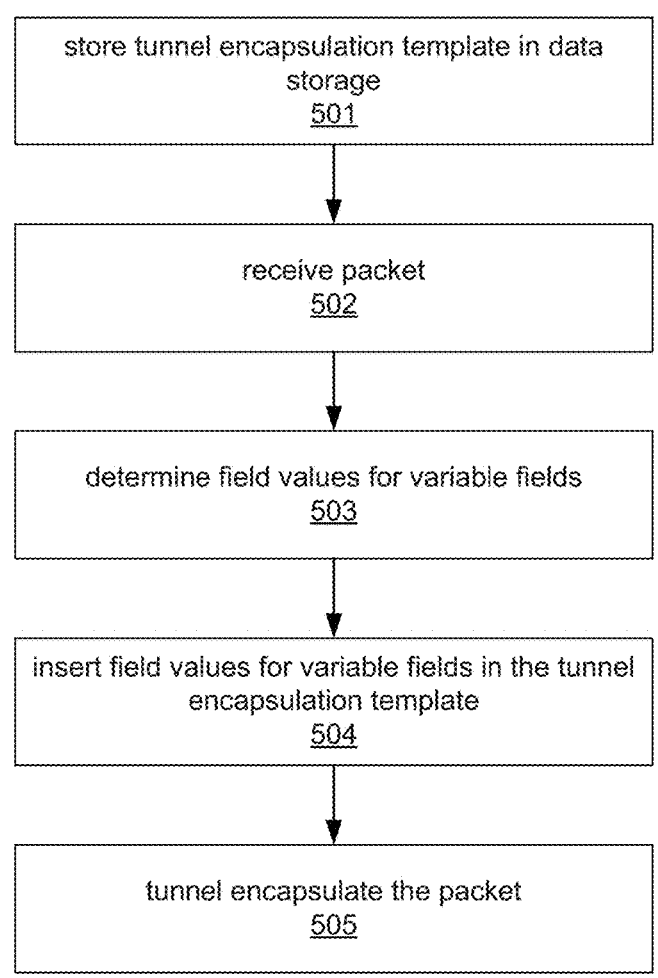
FIG. 5 shows a method, according to an example of the present disclosure.

FIG. 5 shows a method 500 according to an example for tunnel encapsulation. The method 500 may be performed by the integrated circuit 100 shown in FIGS. 1 and 2 and the network device 200 shown in FIG. 2.

At 501, the tunnel encapsulation template 110 is stored in the data storage 103, which may include memory. Examples of the fields for the tunnel encapsulation template 110 are shown in FIGS. 3 and 4. The tunnel encapsulation template 110 includes static fields and variable fields. At 502, a packet, such as the original packet 105 is received, for example, on a port of the ports 210. At 503, field values for the variable fields are determined based on the received packet. For example, the calculation logic 102 calculates field values for the variable fields based on information in the header of the received packet.

At 504, the encapsulation logic 101 inserts the field values for the variable fields in the tunnel encapsulation template 110. At 505, the encapsulation logic 101 generates the tunnel encapsulated packet 106 according to the tunnel encapsulation template 110 with the inserted field values for the variable fields. For example, the tunnel encapsulation template 110 is copied from the data storage 103. The copied tunnel encapsulation template 110 includes field values for the static fields and may also include default field values for the variable fields, which may be overwritten. For example, the calculated field values 120 are overwritten in their corresponding fields to generate the encapsulation header. The tunnel encapsulated packet 106 is generated and transmitted via the tunnel 260 to the network device 250 shown in FIG. 2.

One or more of the steps of the method 500 may be performed simultaneously as bits for the original packet 105 are received. For example, the original packet 105 is received and the header is read to determine the payload size and to calculate the length of the tunnel encapsulated packet 106 being generated. In a next clock cycle, bytes for the tunnel encapsulation template 110 are retrieved from the data storage 103, such as 16 bytes per clock cycle, and simultaneously, variable fields are being overwritten, for example, with field values in the calculated field values 120. The calculated field values 120 may have been calculated in the previous clock cycle and/or their calculations are ongoing. The prefetching and overwriting continues for clock cycles as needed. Also, the inclusion of additional parameters based on an action list may be performed during these clock cycles. The tunnel encapsulated packet 106 may be transmitted as it is generated.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A network chip comprising:
   encapsulation logic to tunnel encapsulate a packet;
   calculation logic to calculate a field value for a tunnel encapsulated packet; and
   data storage to store a tunnel encapsulation template, wherein the tunnel encapsulation template includes fields for the tunnel encapsulated packet, wherein the fields include static fields and variable fields, and the tunnel encapsulation template includes static field values for the static fields;
   wherein to tunnel encapsulate the packet, the encapsulation logic is to:
   receive the packet;
   read a header of the received packet;
   determine field values for the variable fields based on the header of the received packet;

insert the field values for the variable fields in the tunnel encapsulation template;

insert the field value calculated by the calculation logic in a field in the tunnel encapsulation template; and generate the tunnel encapsulated packet based on the received packet and the encapsulation template, wherein the tunnel encapsulated packet includes the field values for the variable fields, the field value calculated by the calculation logic, and the static field values in the static fields;

wherein to tunnel encapsulate the packet, the encapsulation logic is further to determine a parameter from the received packet, determine an action item from an action list, wherein the action item is determined based on the parameter, and calculate one of the field values for one of the variable fields according to the action item or transform a payload of the received packet according to the action item.

2. The network chip of claim 1, comprising:

checksum logic to calculate a checksum, wherein the encapsulation logic is to signal the checksum logic to calculate a checksum of only a subset of the encapsulated packet data.

3. The network chip of claim 2, wherein the subset of the encapsulated packet data comprises header values for a layer 3 header of the encapsulated packet, and the encapsulation logic is to determine the header values for the layer 3 header, and signal the checksum logic to calculate the checksum from the header values for the layer 3 header.

4. The network chip of claim 1, wherein the encapsulation logic is to:

determine a parameter from the received packet; and calculate a variable field value based on the parameter.

5. The network chip of claim 1, wherein the field value calculated by the calculation logic comprises at least one of a length field value and Internet Protocol identification field value.

6. The network chip of claim 1, wherein the data storage is to store configuration information to determine a total length of the tunnel encapsulated packet, a length of a portion of the tunnel encapsulated packet included within a layer 3 header length field, and length to be included in a layer 4 length field.

7. The network chip of claim 1, wherein the calculation logic is to store the calculated field value in the data storage, and the encapsulation logic is retrieve the calculated field value and a corresponding field for the calculated field from the data storage and overwrite the corresponding field with the calculated field value during a same clock cycle.

8. The network chip of claim 1, wherein the network chip transmits the tunnel encapsulated packet over a tunnel, to a destination network device for the tunnel.

9. The network chip of claim 1, further comprising:

tunnel selection logic to select a tunnel from a plurality of tunnels for the received packet based on criteria.

10. A network device comprising:

ports to receive and transmit packets;

tunnel selection logic to determine whether a packet received on a port is to be tunnel encapsulated based on criteria;

tunnel encapsulation logic to tunnel encapsulate the received packet if the tunnel selection logic determines the received packet is to be tunnel encapsulated;

calculation logic to calculate a field value for a tunnel encapsulated packet; and data storage to store a tunnel encapsulation template, wherein the tunnel encapsulation template includes fields for the tunnel encapsulated packet, wherein the fields include static fields and variable fields, and the tunnel encapsulation template includes static field values for the static fields;

wherein to tunnel encapsulate the packet, the encapsulation logic is to calculate variable field values for the variable fields in the tunnel encapsulation template based on the received packet, and generate the tunnel encapsulated packet including the variable fields and the static fields from the encapsulation template and the variable field values and the static field values, and the field value calculated by the calculation logic;

wherein to tunnel encapsulate the packet, the encapsulation logic is further to determine a parameter from the packet;

determine an action item from an action list, wherein the action item is determined based on the parameter; and calculate at least one of the variable field values according to the action item or transform a payload of the packet according to the action item.

11. The network device of claim 10, comprising:

checksum logic to calculate a checksum over a range of field values, wherein the encapsulation logic is to signal the checksum logic at the start and end of inclusion of the range of field values for inclusion in the tunnel encapsulated packet, and the checksum logic is to calculate a checksum for the range of field values for inclusion in an encapsulation header of the tunnel encapsulated packet.

12. The network device of claim 10, wherein the calculation logic is to store the calculated field value in the data storage, and the encapsulation logic is retrieve the calculated field value and a corresponding field for the calculated field from the data storage and overwrite the corresponding field with the calculated field value during a same clock cycle.

13. The network device of claim 10, wherein the data storage is to store configuration information to determine a total length of the tunnel encapsulated packet, a length of a portion of the tunnel encapsulated packet included within a layer 3 header length field, and length to be included in a layer 4 length field.

14. The network device of claim 10, wherein the network device transmits the tunnel encapsulated packet from one of the ports, over a tunnel, to a destination network device for the tunnel.

15. The network device of claim 10, wherein the tunnel selection logic is to select a tunnel from a plurality of tunnels for the received packet based on the criteria.

16. A method comprising:

storing a tunnel encapsulation template in a data storage, wherein the tunnel encapsulation template includes fields for a tunnel encapsulated packet, and the fields include static fields and variable fields, and the tunnel encapsulation template includes static field values for the static fields;

receiving a packet on a port;

determining, by a network chip, field values for the variable fields based on the received packet;

determining a parameter from the received packet;

determining an action item from an action list, wherein the action item is determined based on the parameter;

calculating one of the field values for one of the variable fields according to the action item or transforming a payload of the received packet according to the action item;

inserting the field values for the variable fields in the tunnel encapsulation template; and generating a tunnel encapsulated packet from the received packet, wherein the tunnel encapsulated packet includes the field values for the variable fields in the tunnel encapsulation template, and the static field values in the static fields.

17. The method of claim 16, comprising:

signaling checksum logic at a start and end of a range of field values in the tunnel encapsulation template; and calculating a checksum over the range of field values in response to the signaling.

18. The method of claim 16, further comprising:

storing one of the calculated field values;

retrieving the one of the calculated field values and a corresponding field for the one of the calculated field values; and overwriting the corresponding field with the one of the calculated field values during a same clock cycle.

19. The method of claim 16, further comprising:

transmitting the tunnel encapsulated packet from a further port, over a tunnel, to a destination network device for the tunnel.

20. The method of claim 16, further comprising:

selecting a tunnel from a plurality of tunnels for the received packet based on criteria.

* * * * *